US012681994B2

(12) United States Patent
Kurisu et al.

(10) Patent No.: US 12,681,994 B2
(45) Date of Patent: *\*Jul. 14, 2026*

(54) INFORMATION PROCESSING DEVICE, PROGRAM, AND INFORMATION PROVIDING SYSTEM PROVIDING INFORMATION ABOUT A RELATIONSHIP BETWEEN A SMELL OR A TASTE OF AN OBJECT AND A DESCRIPTION OF THE SMELL OR TASTE

(71) Applicant: JAPAN TOBACCO INC., Tokyo (JP)

(72) Inventors: Toshiharu Kurisu, Tokyo (JP); Sayako Sakuma, Tokyo (JP); Yusuke Okamura, Tokyo (JP); Yoshiyuki Habashima, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 1211 days.

This patent is subject to a terminal disclaimer.

(21) Appl. No.: 17/442,167

(22) PCT Filed: Mar. 24, 2020

(86) PCT No.: PCT/JP2020/012831
§ 371 (c)(1),
(2) Date: Mar. 24, 2022

(87) PCT Pub. No.: WO2020/196445
PCT Pub. Date: Oct. 1, 2020

(65) Prior Publication Data
US 2022/0218263 A1 Jul. 14, 2022

(30) Foreign Application Priority Data
Mar. 27, 2019 (JP) ................................. 2019-061619

(51) Int. Cl.
*G06F 16/9038* (2019.01)
*G06F 16/904* (2019.01)

(52) U.S. Cl.
CPC ........ *G06F 16/9038* (2019.01); *G06F 16/904* (2019.01)

(58) Field of Classification Search
None
See application file for complete search history.

(56) References Cited

U.S. PATENT DOCUMENTS

| | | | | | |
|---|---|---|---|---|---|
| 8,433,595 B2 * | 4/2013 | Fushimi | ............. | G06Q 30/0201 | |
| | | | | 705/7.42 | |
| 10,802,691 B2 * | 10/2020 | Ikuta | ..................... | G06F 16/904 | |

(Continued)

FOREIGN PATENT DOCUMENTS

| | | | |
|---|---|---|---|
| CN | 109325383 A | | 2/2019 |
| JP | 2006113254 A | * | 4/2006 |

(Continued)

OTHER PUBLICATIONS

Aromaster Professional Sommelier Wine Aroma Kit 88 Wine Aromas (wine aroma wheel and board game included) from Amazon. com Sep. 24, 2015 (Year: 2015).*

(Continued)

*Primary Examiner* — Xuan M Thai
*Assistant Examiner* — Andrew Bodendorf
(74) *Attorney, Agent, or Firm* — Oliff PLC

(57) ABSTRACT

A device configured to display a visual representation of a relationship between a smell or a taste of an object and a verbal description of the smell or taste. A display control unit controls a projector to display, in a display area including a position of a sample, specified by a position specifying unit, one or more descriptions relating to the sense of smell or taste associated with the sample. The display control unit displays the descriptions with an appearance corresponding to the sample specified by a sample specifying unit.

8 Claims, 7 Drawing Sheets

(56) References Cited

U.S. PATENT DOCUMENTS

| | | | | |
|---|---|---|---|---|
| 2004/0077424 | A1* | 4/2004 | Murphy | A61L 9/12 |
| | | | | 348/E5.042 |
| 2007/0178046 | A1* | 8/2007 | Herz | A63F 9/18 |
| | | | | 424/9.1 |
| 2008/0040344 | A1* | 2/2008 | Hayama | G06F 16/93 |
| 2008/0160147 | A1* | 7/2008 | Tormey | G09F 3/02 |
| | | | | 426/383 |
| 2008/0191864 | A1* | 8/2008 | Wolfson | G06F 3/04815 |
| | | | | 434/323 |
| 2010/0107785 | A1 | 5/2010 | Kugimiya et al. | |
| 2013/0120771 | A1* | 5/2013 | Wang | H04N 1/32133 |
| | | | | 358/1.9 |
| 2015/0379892 | A1* | 12/2015 | Sako | G16H 20/60 |
| | | | | 434/127 |
| 2017/0017944 | A1* | 1/2017 | Sasahara | G06Q 20/201 |
| 2017/0061475 | A1* | 3/2017 | Kuwabara | G06Q 30/02 |
| 2017/0131689 | A1* | 5/2017 | Chan | H04W 4/80 |
| 2018/0140950 | A1* | 5/2018 | Nishimaki | A63F 13/50 |
| 2018/0373272 | A1* | 12/2018 | Kihm | A61L 9/03 |
| 2019/0019033 | A1* | 1/2019 | Chang | G06V 20/41 |
| 2019/0213192 | A1* | 7/2019 | Silvain | G06F 16/24575 |
| 2020/0163487 | A1* | 5/2020 | Kihara | G07F 13/00 |
| 2020/0218415 | A1* | 7/2020 | Jang | G06N 3/08 |
| 2020/0258137 | A1* | 8/2020 | Yang | G06Q 30/0641 |
| 2020/0349630 | A1* | 11/2020 | Maruoka | G06Q 30/0623 |
| 2021/0052762 | A1* | 2/2021 | Kwon | A61L 9/125 |
| 2021/0103625 | A1* | 4/2021 | Kamei | G06F 3/0481 |
| 2021/0187148 | A1* | 6/2021 | Sivagaminathan | |
| | | | | G06Q 30/0203 |
| 2021/0209153 | A1* | 7/2021 | Zhang | G06F 3/013 |
| 2021/0397758 | A1* | 12/2021 | Haeni | G06Q 30/0643 |
| 2021/0398185 | A1* | 12/2021 | Hershey | G06T 7/10 |
| 2023/0004279 | A1* | 1/2023 | Kurisu | G06F 16/381 |

FOREIGN PATENT DOCUMENTS

| | | | | |
|---|---|---|---|---|
| JP | 2016-180830 A | 10/2016 | | |
| JP | 2019-192091 A | 10/2019 | | |
| KR | 10-2019-0059728 A | 5/2019 | | |
| WO | WO-2005109246 A1 * | 11/2005 | | G06F 16/93 |
| WO | WO-2011001156 A1 * | 1/2011 | | G01N 33/0001 |
| WO | 2015/114785 A1 | 8/2015 | | |
| WO | WO-2019031363 A1 * | 2/2019 | | A23F 5/10 |
| WO | WO-2019087502 A1 * | 5/2019 | | G06F 3/011 |
| WO | 2019/211243 A1 | 11/2019 | | |
| WO | WO-2021059642 A1 * | 4/2021 | | |

OTHER PUBLICATIONS

International Search Report (English and Japanese) of the International Searching Authority issued in PCT/JP2020/012831, mailed Apr. 28, 2020; ISA/JP (5 pages).

Mar. 9, 2021 International Search Report issued in International Patent Application No. PCT/JP2020/044639.

Jun. 1, 2023 Office Action issued in Chinese Patent Application No. 202080085623.7.

Oct. 24, 2023 Extended European Search Report issued in European Patent Application No. 20899437.6.

* cited by examiner

| SAMPLE ID | FIRST DESCRIPTION | APPEARANCE OF FIRST DESCRIPTION | SECOND DESCRIP-TION | APPEARANCE OF SECOND DESCRIPTION | THIRD DESCRIP-TION | APPEARANCE OF THIRD DESCRIPTION | ... | N-TH DESCRIP-TION | APPEARANCE OF N-TH DESCRIPTION |
|---|---|---|---|---|---|---|---|---|---|
| ID001 | SWEET | DISTANCE: 2 UNITS COLOR: RED FONT: GOTHIC SIZE: 25 POINTS MOVEMENT: BLINKING | FRESH | ... | FLOWER | ... | ... | ... | ... |
| ID002 | BRISK | ... | CLEAR | ... | ... | ... | ... | ... | ... |
| ID003 | TRANCEPAR ENCY | ... | CREEK | ... | ... | ... | ... | ... | ... |
| ID004 | GORGEOUS | ... | WOODY | ... | ... | ... | ... | ... | ... |
| ID005 | ... | ... | ... | ... | ... | ... | ... | ... | ... |
| ID006 | ... | ... | ... | ... | ... | ... | ... | ... | ... |
| ID007 | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |

FIG. 4

INFORMATION PROCESSING DEVICE, PROGRAM, AND INFORMATION PROVIDING SYSTEM PROVIDING INFORMATION ABOUT A RELATIONSHIP BETWEEN A SMELL OR A TASTE OF AN OBJECT AND A DESCRIPTION OF THE SMELL OR TASTE

TECHNICAL FIELD

The present invention relates to a technique for describing a smell or taste of an object.

RELATED ART

Smells are known to provide various benefits to humans by stimulating the limbic system, which has a role in controlling emotion, behavior and memory. For example, Patent Document 1 discloses a method in which a subject smells a smell is asked a question about memories associated with the smell, and a numerical value is assigned to the answer, and is recorded.

PRIOR ART

Patent Document

[Patent Document 1] JP 2016-180830 A

SUMMARY

Problem to be Solved

Generally, it is difficult for people to accurately describe a smell to themselves or to others. This is because most people are not required to describe smells and thus they lack a working vocabulary to do so. Moreover, people tend not to able to clearly recognize a correspondence between a smell and a description to be used for the smell. This limitation also applies to describing taste.

It is thus an object of the present invention to provide via visual representation a relationship between a smell or a taste of an object and a verbal description of the smell or taste.

Solution

To solve the problems, according to one aspect of the invention, there is provided an information processing device including: a position specifying unit that specifies a location of an object that stimulates a user's sense of smell or taste; and a display control unit that displays, in a display area corresponding to the identified position of the object, one or more descriptions relating to the sense of smell or taste stimulated by the object, each of the descriptions being displayed by a predetermined appearance.

The display control unit may display the one or more descriptions by an appearance that corresponds to a relationship between the object and the one or more descriptions relating to the sense of smell or taste stimulated by the object.

The display control unit may display the one or more descriptions by an appearance that corresponds to a relationship between the user's preference for smell or taste and the one or more descriptions relating to the smell or taste stimulated by the object.

The display control unit may display the one or more descriptions in an appearance that corresponds to an attribute of the sense of smell or taste stimulated by the object.

The display control unit may display the one or more descriptions in an appearance that corresponds to the attribute of the one or more descriptions relating to the sense of smell or taste stimulated by the object.

When any of the one or more of the displayed descriptions is selected by the user, the display control unit may display a relational image, which is an image showing a relationship between the selected one or more descriptions and other objects that correspond to the sense of smell or taste associated with the one or more descriptions.

The display control unit may display the relational image by an appearance that accords with the sense of smell or taste associated with the selected one or more descriptions and the user's preference for the sense of smell or taste.

According to another aspect of the invention, there is provided a program for causing a computer to implement: a position specifying unit that specifies a location of an object that stimulates a user's sense of smell or taste, and a display control unit that displays, in a display area corresponding to the identified position of the object, one or more descriptions relating to the sense of smell or taste stimulated by the object, wherein each of the one or more descriptions is displayed by a predetermined appearance.

According to yet another aspect of the invention, there is provided an information providing system including: an input device; a display device; and an information processing device including an specifying unit that specifies a location of an object that stimulates a user's sense of smell or taste; and a display control unit that displays, in a display area corresponding to the identified position of the object, one or more descriptions relating to the sense of smell or taste stimulated by the object, each of the descriptions being displayed by a predetermined appearance.

Effect of the Invention

According to the present invention, a relationship between a smell or taste of an object and a verbal description of the smell or taste can be understood visually.

BRIEF DESCRIPTION OF THE DRAWING

FIG. 4 is an example of the Description DB stored by the information processor.

DETAILED DESCRIPTION

Configuration

Figure 1:
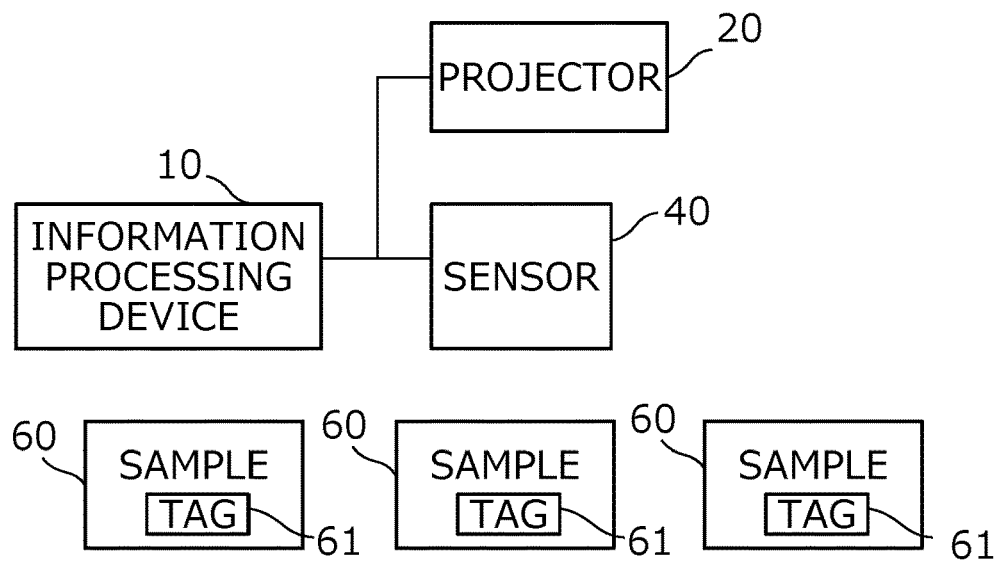
FIG. 1 is a block diagram illustrating the overall configuration of an information providing system according to one embodiment of the invention.

The overall configuration of the information providing system 1 according to one embodiment of the invention will now be described. The information providing system 1 is a system for providing information to enable a user to visually understand a relationship between a smell of an object and a verbal description of the smell. As shown in FIG. 1, the information providing system 1 includes an information processing device 10, a projector 20, a sensor 40, and plural samples 60. The information processing device 10, the projector 20 and the sensor 40 communicate with each other via wired or wireless connections. The information processing device 10 is an example of an information processing device according to the present invention, and is a device that controls other devices in the information providing system 1. The projector 20 is an example of a display device that displays information to a user. The sensor 40 is an example of an input device that receives an input from a user. Each of the plural samples 60 is an object that emits a smell that stimulates the user's sense of smell. For example, sample 60 may be a natural product that emits a smell (e.g., a lavender plant) or an artificial product that contains the smell of lavender (e.g., an extract of lavender in volatile liquid form, a sheet impregnated with the liquid, or the like). In this embodiment, the sample 60 is a cylindrical vial that is sealed with a lid and contains a liquid in the form of an extract oil that emits a smell of a natural product. Each sample 60 has a label or tag that includes the name of the sample (e.g., the name of the plant "lavender"). By referring to the label or tag name, the user is able to visually identify each sample.

Figure 2:
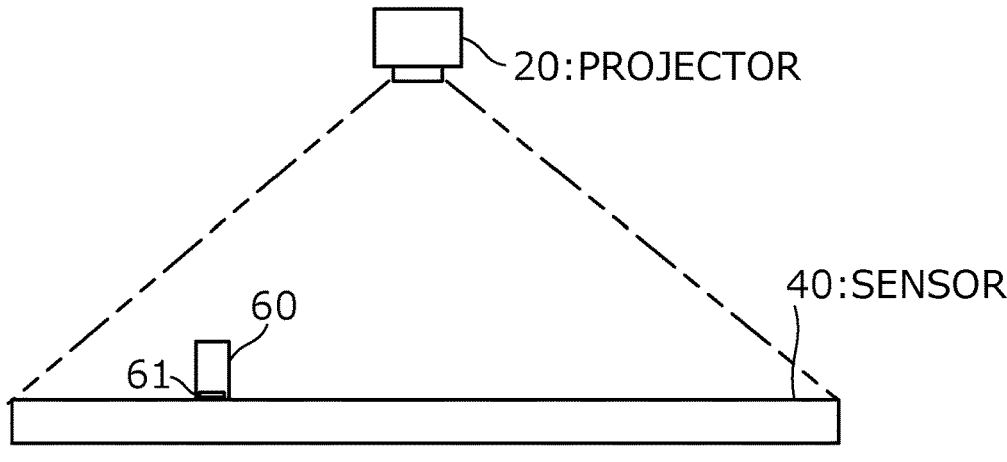
FIG. 2 is a side view illustrating the structure of the information providing system.

FIG. 2 is a side view illustrating a structure of the information providing system 1. More specifically, FIG. 2 is a view illustrating a positional relationship of the projector 20, the sensor 40, and the sample 60 as viewed from a horizontal direction. The sensor 40 is constituted of, for example, a thin rectangular plate, an upper surface of which is a flat sensing surface. The sample 60 has a tag 61, which is a storage medium for storing identification information (hereinafter referred to as a "sample ID") for specifying each sample 60. When the sample 60 is placed on the sensing surface, the sensor device 40 reads the sample ID stored in the tag 61 of the sample 60 by using, for example, a short-range wireless communication standard, referred to as Near Field Communication (NFC), and detects the position where the sample 60 is placed (i.e., the position where the tag 61 is read on the sensing surface). The sensor device 40 also functions as a touch screen, and for example, when the sensing surface is touched by a user's finger or a predetermined stylus, the touched position on the sensing surface is detected. The position where the sample 60 is placed or the position at which it is touched by the user is described as X, Y coordinates in a two-dimensional coordinate plane wherein a specified position of the sensing surface serves as an origin.

The projector 20 is installed above the sensor 40 (for example, on a ceiling of a room). As indicated by the dashed line in FIG. 2, the projector device 20 covers an entire area of the sensing surface of the sensor 40, and is capable of projecting an image to any position on the sensing surface defined by the above X, Y coordinates. In other words, the sensing surface of the sensor device 40 also functions as a display surface on which an image is displayed.

Figure 3:
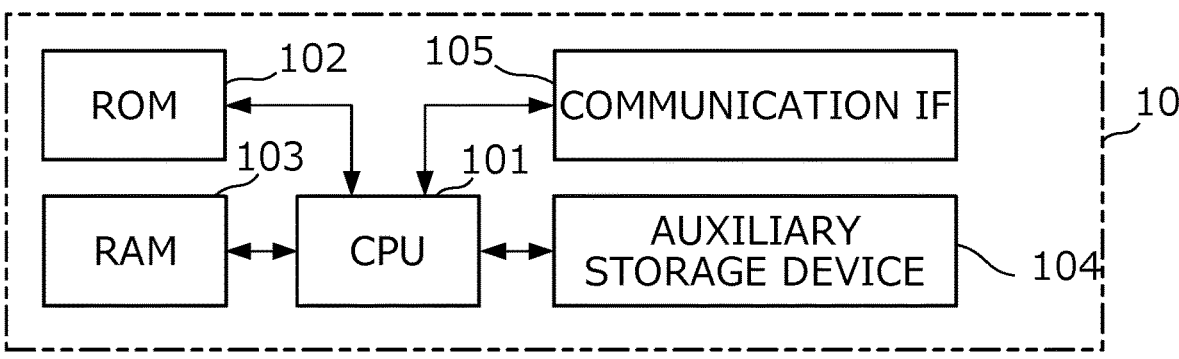
FIG. 3 is a block diagram illustrating an example of a hardware configuration of an information processing device according to an embodiment of the invention.

FIG. 3 is a diagram illustrating a hardware configuration of the information processing device 10. The information processing device 10 is a computer that includes a CPU (Central Processing Unit) 101, a ROM (Read Only Memory) 102, a RAM (Random Access Memory) 103, an auxiliary storage device 104, and a communication IF (Interface) 105.

The CPU 101 is a processor that performs various operations. The ROM 102 is a non-volatile memory that stores, for example, a program and data used for booting the information processing device 10. The RAM 103 is a volatile memory that functions as a work area when the CPU 101 executes the program. The auxiliary storage device 104 is a non-volatile storage device such as, for example, a HDD (Hard Disk Drive) or an SSD (Solid State Drive), and stores a program and data used in the information processing device 10. By executing the program, the CPU 101 realizes the functions described below and also executes the operations described below. The communication IF 105 is an interface that performs communication in accordance with a predetermined communication standard. The communication standard may be a standard for wired communication or a standard for wireless communication. In addition to the configuration illustrated in FIG. 3, the information processing device 10 may include other elements, such as, for example, a display device such as a liquid crystal display and an input device such as a keyboard.

The auxiliary storage device 104 stores a description database (hereinafter, simply referred to as a description DB) as shown in FIG. 4. In the description DB, each sample ID includes one or more descriptions (i.e., one or more descriptions that describe the smell of the sample 60, and are displayed as characters) that describe the smell sense stimulated by the sample 60 in correspondence with the sample ID. In other words, the description acts to convey a smell of the sample 60 to others when the user smells the smell of the sample 60. The description may consist of any component part of language, such as, for example, a noun or an adjective; and may also include direct and indirect descriptions of the smell. Here, a direct description is one that is customarily used to evoke a sense of a smell, such as "sweet" or "fruity," for example, while an indirect description is one that is not customarily used to describe a smell, such as "spring," "morning," or "walk." Indirect descriptions may function as descriptions that are secondary and complementary to direct descriptions. Indirect descriptions may also consist of abstract terms.

Further, the Description DB includes appearance information for displaying each description. The appearance information includes information corresponding to, for example, a position at which the description is displayed relative to smell from an object (sample 60), the distance between the position at which the description is displayed and the sample 60, the direction of the display position of the description relative to the sample 60, the color in which the description is displayed, the size at which the description is displayed, the font with which the description is displayed, the modification with which the description is displayed, the time at which the description is displayed, the time period of displaying the description, the movement of the description (including spatial or temporal changes of the description), or the language used for the description, and so on.

This display information depends on a relationship between the sample 60 and its description. The relationship between the sample 60 and its description consists of an intensity and an amount of a smell (more specifically, components contained in the smell of the sample) as described by the description of the sample 60; or a level of abstraction of the description relative to the smell. For example, the description "sweet" may be displayed proximate to a sample 60 that has a strong sweet smell, or the description "sweet" may be prominently displayed in large characters or in a strong color on the sample 60 that has a strong sweet smell, or the description "sweet" may be prominently displayed on the sample 60 that has a strong sweet smell by movement as in vibration. Also, for example, for a sample that has both a strong sweet smell and a weak fruity smell, the description "sweet" may be displayed proximate to the sample, while the description "fruity" may be displayed farther away from the sample. This is an example of an appearance that changes dependent on a relationship between the sample 60 and its description. In addition, when a direct description and an indirect description are associated with a particular sample, a distance between the sample 60 and its description may be changed dependent on a level of abstraction of the description, such that a direct description is displayed proximate to the sample and an indirect description is displayed farther away from the sample this is also an example of an appearance that changes dependent on a relationship between the sample 60 and its description. In short, a description is displayed as visual information such that a relationship between the sample 60 and its description (specifically, a strength of a relationship and a characteristic of the relationship) are displayed for ease of visual recognition.

In the example shown in FIG. 4, the sample 60 having the sample ID "ID001," "sweet" is recorded as description 1, "fresh" is recorded as description 2, and "flower" is recorded as description 3, and so on. Among these descriptions, the visual information of the description 1, "sweet," has the following characteristics: a distance between the position at which the description is displayed and the sample is "2 units" (1 unit is a length determined in relation to the sensing surface), the color is "red," the font is "Gothic," the size is "25 points," and the movement is "blinking."

Figure 5:
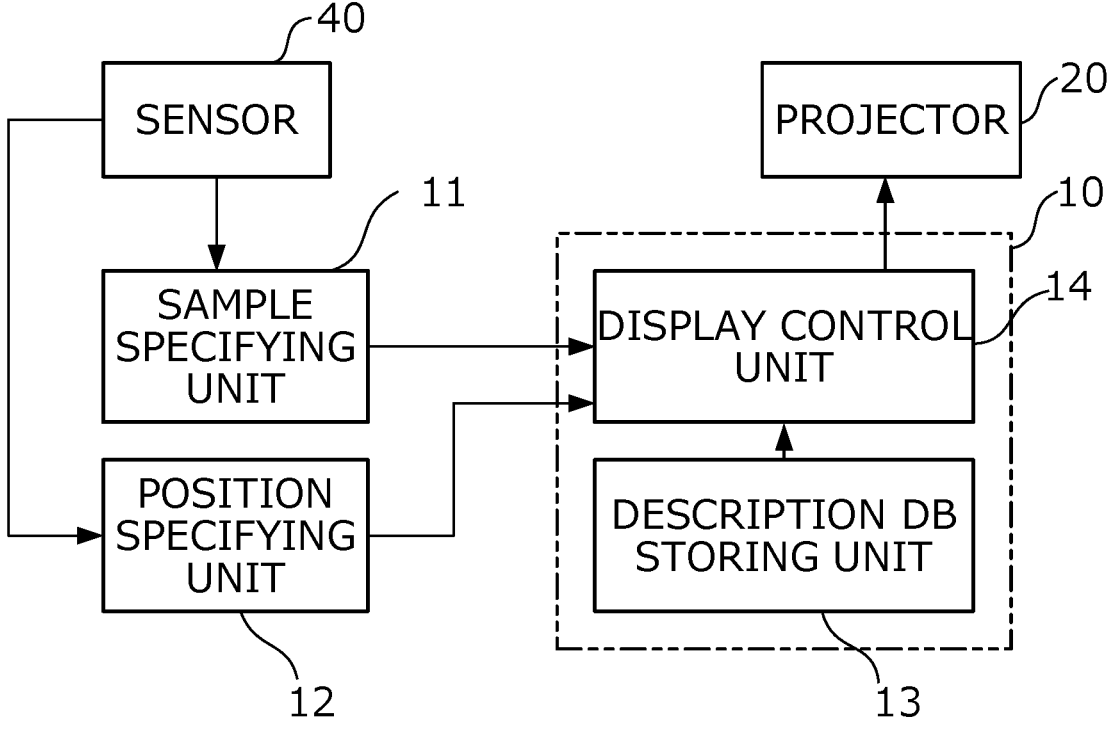
FIG. 5 is a block diagram illustrating an example of the functional configuration of an information processing device.

FIG. 5 is a block diagram showing an exemplary functional configuration of the information processing device 10. In the information processing device 10, the functions of a sample identification unit 11, a location identification unit 12, a description DB storage unit 13, and a display control unit 14 are implemented.

When a sample 60 is placed on the sensing surface of the sensor (device) 40, the sample specifying unit 11 specifies the sample 60 that is placed on the sensing surface based on the read sample ID stored in the tag 61 of the sample 60.

When the sample 60 is placed on the sensing surface of the sensor (device) 40, the position specifying unit 12 specifies the position on the sensing surface at which the sample 60 is placed (i.e., the position at which the sample 60 is placed on the sensor (device) 40) based on the position at which the sample ID stored in the tag 61 of the sample 60 was read (i.e., the position at which the operation to place the sample 60 was performed on the sensor (device) 40). In addition, when the sensing surface of the sensor (device) 40 is touched by a user, the position-specifying unit 12 specifies a position of the sensing surface that was touched.

The display control unit 14 controls the projector (device) 20 to display one or more descriptions of the sense of smell stimulated by the sample 60 identified by the sample identification unit 11 in the display area corresponding to the position of the sample 60 identified by the position identification unit 12. At this time, the display control unit 14 displays the descriptions in accordance by the appearance information that corresponds to the samples identified by the sample identification unit 11 in the description DB that is stored in the description DB storage unit 13. The display area corresponding to the position of the sample 60 is, for example, an area on the sensing surface that is within a determined distance from the position of that sample 60, and a specific example, is a circular area within a radius of 10 centimeters centered at a position of the sample 60 on the sensing surface. However, the display area corresponding to the position of the sample 60 is not limited to this example, and may be an area that a user is able to recognize as a sample to which the displayed description relates.

Further, when any of the one or more displayed descriptions is selected by the user, the display control unit 14 displays a related image, which is an image that shows a relationship between the selected description and other samples 60 corresponding to the olfactory sensation associated with the description, as will be described in detail later with reference to FIG. 10.

Operation

Figure 6:
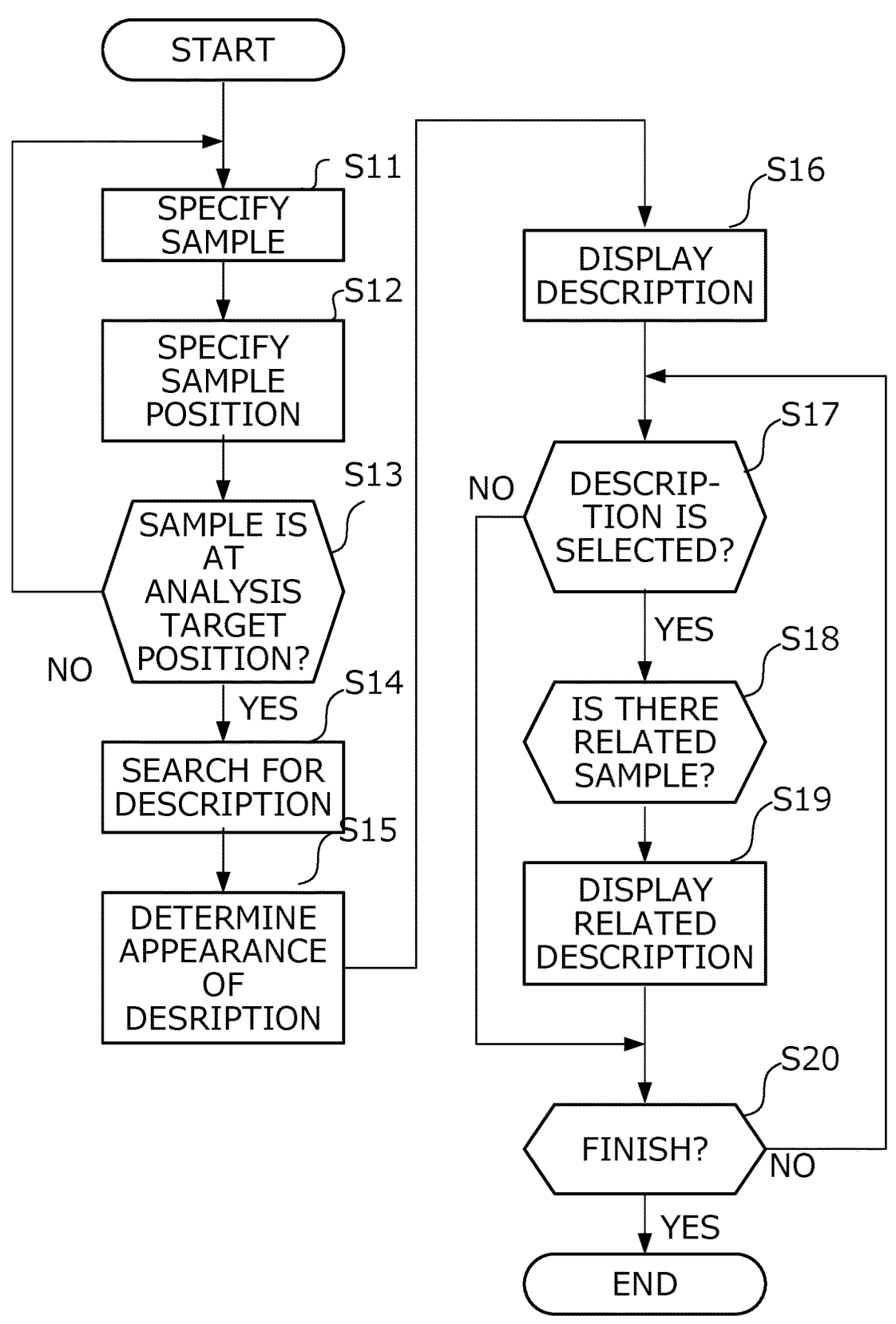
FIG. 6 is a flowchart illustrating an example of the operation of the information processing device.

An exemplary operation of the present embodiment will now be described with reference to the flowchart shown in FIG. 6. First, the user selects samples 60 of interest by referring to the names of the samples shown on the samples 60, and places the samples on the sensing surface of the sensor 40.

Figure 7:
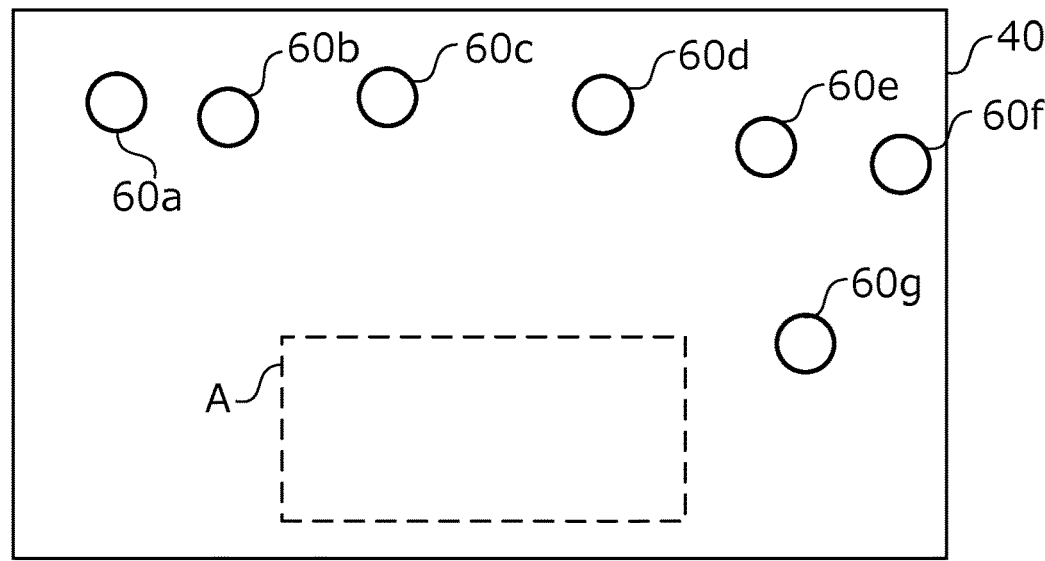
FIG. 7 is a plan view illustrating a sensing surface of a sensor device viewed from above when the information providing system is used.

In FIG. 7 a plan view is shown that illustrates from above a view of the sensing surface of the sensor 40. In this example, seven samples 60a to 60g are placed on the sensing surface of the sensor 40. At this time, the sample specifying unit 11 of the information processing device 10 specifies (at step S11 in FIG. 6) which sample(s) 60 is/are placed on the sensing surface based on the reading of the sample ID by the sensor 40. Further, the location specifying unit 12 of the information processing device 10 specifies (at step S12) for each sample 60 the position at which the sample 60 is placed on the sensing surface based on the reading position of the sample ID by the sensor 40. At this step, it is identified that the samples 60a to 60g have been placed at the respective positions illustrated in FIG. 7. The order of the processing at steps S11 and S12 may be changed from those of the example in FIG. 6, or the processes may be performed substantially simultaneously.

Among samples 60a to 60g placed on the sensing surface of the sensor (device) 40, the user selects a sample (here, sample 60g), for which the user wishes to know a description relating to a smell of the sample, and places the selected sample at a predetermined position on the sensing surface. The predetermined position is a closed area indicated by a dashed line image displayed on the sensing surface by the projector (device) 20 as shown in FIG. 7, and is referred to as an "analysis target position A." The position, shape, and size of the analysis target position A may be determined at will, but it is necessary for the user to know or to be informed in advance by means of display, voice guidance, or the like an area on the sensing surface that is the analysis target position A.

Figure 8:
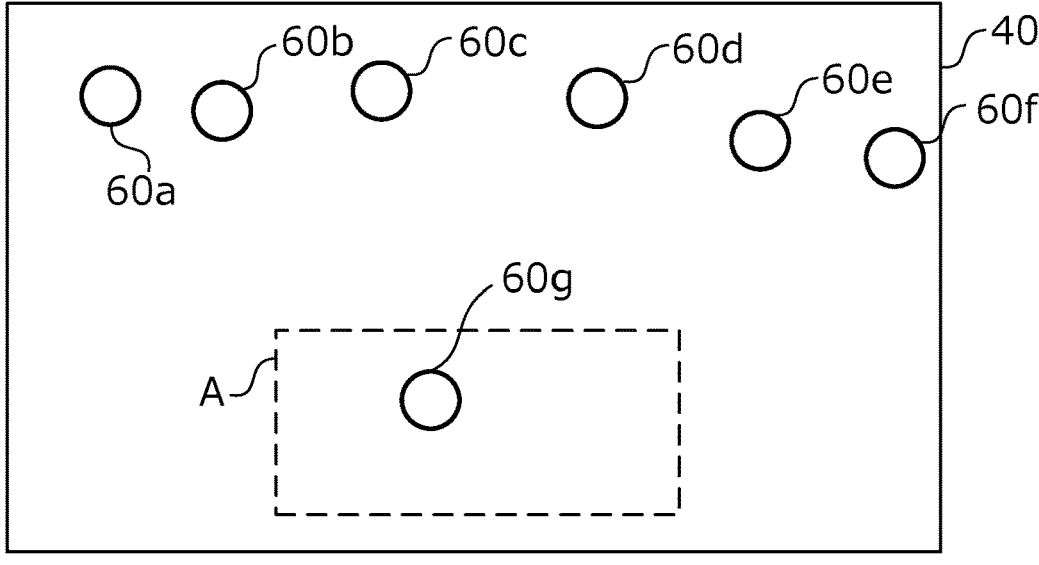
FIG. 8 is a plan view illustrating the sensing surface of the sensor device viewed from above when the information providing system is used.

As shown in FIG. 8, the sample 60g is placed at the analysis target position A on the sensing surface. At this time, the position specifying unit 12 determines that the sample 60g is at the analysis target position on the sensing surface (at step S13 in FIG. 6; YES). It is of note that regarding the state shown in FIG. 7, since the position specifying unit 12 determines that none of the samples 60 is at the analysis target position on the sensing surface (at step S13 in FIG. 6; NO), the process remains in a standby state while the process (at step S11) relating to the identification of the samples 60 and the process (at step S12) relating to the identification of the position of the samples 60 are performed.

When it is determined that the sample 60G is in the analysis target position, the display control unit 14 searches (at step S14 in FIG. 6) for descriptions corresponding to the sample ID in the description DB, by using the sample ID of the sample 60G as a search key. Further, the display control unit 14 determines (at step S15 in FIG. 6) an appearance corresponding to each of the searched descriptions by referring to the description DB. Then, the display control unit 14 controls the projector (device) 20 to display (at step S16 in FIG. 6) the descriptions retrieved at step S14 in the display area corresponding to the position of the sample 60g identified by the position identification unit 12, in accordance by the appearance determined at step S15.

Figure 9:
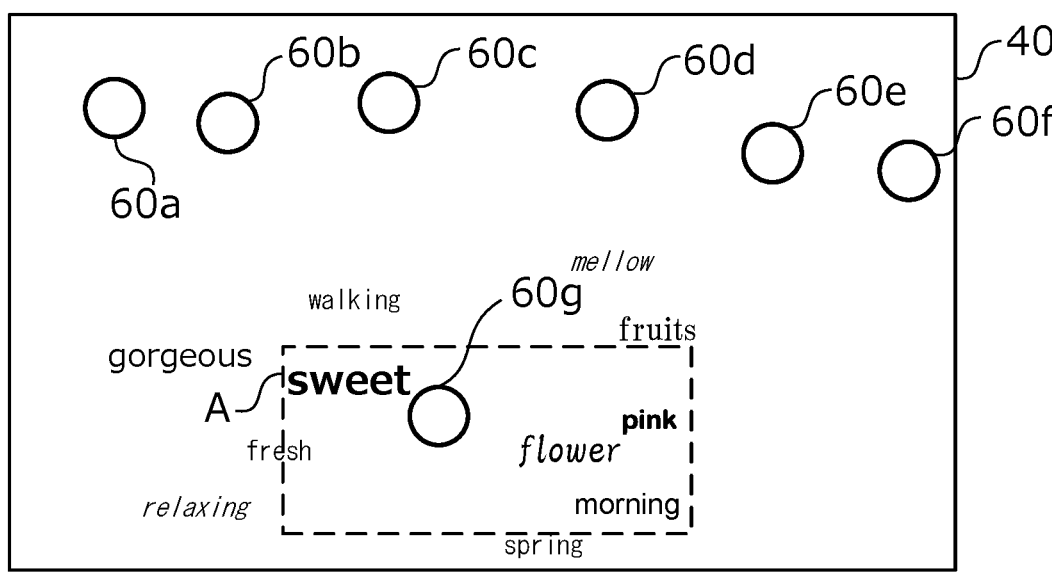
FIG. 9 is a plan view illustrating the sensing surface of the sensor device viewed from above when the information providing system is used.

According to the above processes, the descriptions relating to the smell of the sample 60g are displayed, for example, inside a circle centered on the position of the sample 60g, and having a size as illustrated in FIG. 9. At this time, each description is displayed by an appearance that corresponds to the relationship between the description and the sample 60g, as described above. By opening the lid of the sample 60g and smelling the smell of the sample 60g while viewing descriptions, the user is able to determine how to describe the smell of the sample 60g. At the same time, the user is also able to determine the relationship between the smell of the sample 60g and each description by referring to the appearance with which each description is displayed. For example, in the example shown in FIG. 9, the user can see that the smell of the sample 60g is a smell that is typically described as "sweet," but also contains smell components that are described as "fresh," "gorgeous," "relaxing," "mellow," "flower," and "fruit," and also that these smells can be used to describe "spring," "morning," "pink," "walk," and "light," and are associated with such concepts.

Further, if there is a description among the displayed group of descriptions that the user is interested in or wishes to better to understand, the user selects the description by touching the description displayed on the sensing surface. When the user touches the description (at step S17 in FIG. 6; YES), the display control unit 14 specifies the description selected by the user based on the position touched by the user and a display position of each of a description. At this time, it is preferable to display the description with a specific background color, or to highlight the description so that the user can easily identify which description has been selected.

Then, the display control unit 14 searches, in the description DB, for a sample ID that is associated with the selected description among the group of sample IDs identified at step S11. If a sample ID that is associated with the selected description is found by the search, the display control unit 14 determines that a sample related to the selected description is to be placed on the sensing surface (at step S18; YES), and controls (at step S19) the projector (device) 20 to display a relational image. The relational image is, for example, a line-shaped image connecting a display position of the description selected by the user via the sensing surface and at a position where the sample corresponding to the found sample ID is placed.

Figure 10:
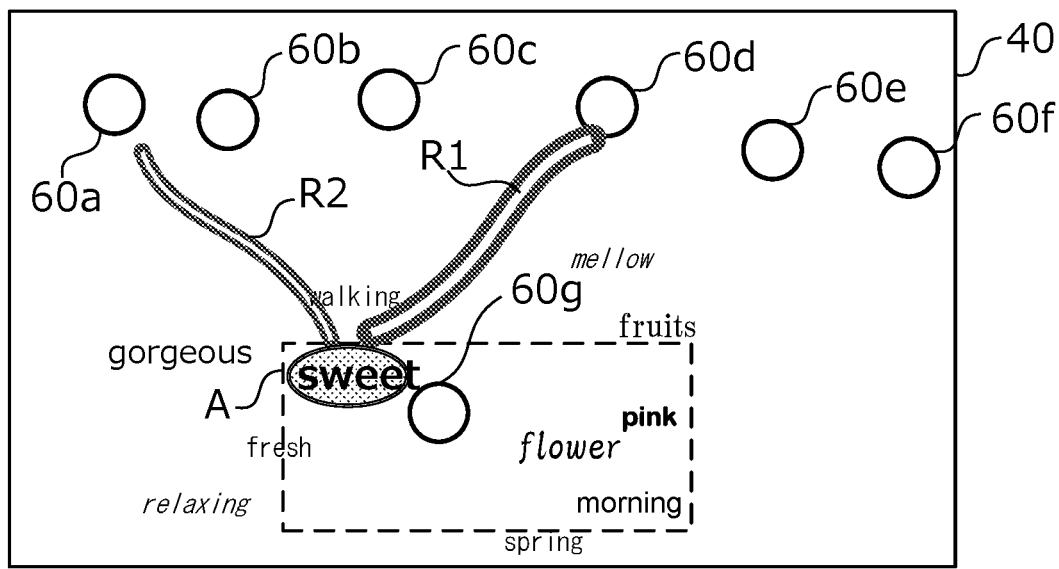
FIG. 10 is a plan view illustrating the sensing surface of the sensor device viewed from above when the information providing system is used.

According to the above processes, relational images R1 and R2 connected with the description "sweet" are selected by the user along with other samples described by the description "sweet" (here, samples 60a and 60d) are displayed, as illustrated in FIG. 10. From these relational images R1 and R2, the user can see that, in addition to the sample 60g, there are also samples 60a and 60d that correspond to smells described as "sweet."

Appearances such as color, thickness, size, movement, etc., of the relational image are based on the relationship between the description selected by the user and the other samples described by the description. For example, when the relationship between the description selected by the user and the other samples described by the description is strong, a color, thickness, size, movement, etc. are displayed in such a way that the relational image is more prominent, and vice versa when the relationship is weak. In the example shown in FIG. 10, since the sample 60d has a strong relationship to the description "sweet," the relational image R1 connecting the description "sweet" and the sample 60d is depicted as a thicker image than the relational image R2 connecting the description "sweet" with the sample 60a. The relationship between the description selected by the user and the other samples described by the description is determined based on the appearance determined in the description DB. In the example shown in FIG. 10, the appearance corresponding to the description "sweet" and the sample 60d in the description DB is one used when the relationship is stronger than that of the appearance corresponding to the description "sweet" and the sample 60a.

If the user wishes to obtain further information about another description, the user can obtain such information by touching another description on the sensing surface (at step S20; NO). If the user touches another description, the above steps S17 to S19 are executed for the another description. Then, if the user wishes to know the description for the new sample 60, the user performs (at step S20; YES) the predetermined operation to terminate the process and replaces the sample at the analysis target position A. As a result, the above steps S11 to S19 are repeated for another description. In this way, the user can try various samples of smells and view their corresponding descriptions.

The above-described embodiment enables a user to understand a visual relationship between a smell of an object and a description of its smell.

Modifications

The present invention is not limited to the above described embodiments. The above described embodiments may be modified as follows. Further, two or more items described in the following modifications may be combined.

First Modification

The present invention is applicable not only to olfactory objects but also to gustatory objects (e.g. wine, Japanese rice wine, spices, seasonings, and so on). In other words, the present invention may be implemented by replacing smell in the embodiments with taste.

Second Modification

The appearance of each displayed description may be determined in accordance with a relationship between the description and the user who views the displayed description. The relationship between the description and the user includes, for example, a degree of agreement between the smell described by the description and the user's preference for the smell, and a history of the user's use of the description as a description of the smell. For example, for a user who prefers a "sweet" smell, an example of the description "sweet" is displayed proximate to the sample 60 at the analysis target position A, with the description "sweet" displayed in a large format or a strong color, or the description "sweet" is displayed in a conspicuous manner by use of movement such as vibration. In this case, user preferences for smells are collected and stored in a database in advance in an auxiliary storage device 104 or the like, and the display control unit 14 refers to the database.

For example, for a user who has frequently used the description "sweet" in the past, the description "sweet" is displayed proximate to the sample 60 placed at the analysis target position A, or the description "sweet" displayed in a conspicuous manner by use of movement such as vibration. In this case, a history of descriptions used by the user to describe the smell is collected in advance and stored in a database in the auxiliary storage device 104 or the like, and the display control unit 14 refers to the database.

Third Modification

The appearance by which each description is displayed may be determined in accordance with an attribute of the smell described by the description. The attributes of a smell may include, for example, a top note, a middle note, or a lower note, the strength/weakness of the stimulus of the smell, and the degree of interest, specialness, or rarity of the smell. The top note, the middle note, and the lower note of the smell may change over time, for example, when a first smell is recognized, a next smell is recognized, and then a further next smell is recognized. For instance, there can be envisaged an example of displaying descriptions corresponding to a top note, a middle note, and a lower note in order or distance from a position ranging from proximate to far from the sample 60 placed at the analysis target position A; or an example of switching the display of descriptions corresponding to a top note, a middle note, and a lower note in chronological order may be applied. In addition, an example in which descriptions that relate to highly stimulating smells or rare smells are displayed in a specific color, font, or movement, may be applied.

Fourth Modification.

The appearance in which each description is displayed may be determined in accordance with an attribute of the description. The attributes of the description include, for example, an image corresponding? to the description, a language component of the description, a character (Japanese hiragana, Japanese katakana, Japanese kanji, alphabet, etc.) used in denoting the description, a number of characters/words constituting the description, and the like. For example, the description "sweet" may be displayed in a warm color.

Fifth Modification

When displaying the relational image (see FIG. 10), the display control unit 14 may display the relational image by an appearance in accordance with a user's preference for the smell described by the description selected by the user on the sensing surface. For example, in the relational image connecting the description "sweet" selected by the user and the other samples described by the description, the appearance such as the color, thickness, size, movement, etc. thereof is changed according to the user's preference for the "sweet" smell. Specifically, if the user prefers a "sweet" smell, the color, thickness, size, movement, etc. of the relational image may be made more prominent. In this case, the user's preferences for smells are collected and put into a database in advance and stored in the auxiliary storage device 104 or the like, and the display control unit 14 refers to the database. The relational image is not limited to the linear image illustrated in FIG. 10, and may be any image that shows that the description selected by the user and the sample described by the description are related. For example, a first circular image enclosing the description "sweet" selected by the user and a second circular image enclosing the position of the other sample 60 described by the description "sweet" may be used as the relational image.

Sixth Modification

The display device and the input device are not limited to the projector (device) 20 and the sensor (device) 40 illustrated in FIG. 1. For example, the display (device) 20 is not limited to a device that projects an image onto the sensing surface of the sensor (device) 40, which is an input device, as described in the embodiments. However, for example, the input device itself may be a display device. The display device may also be a device that displays an image on a wall surface (including cases where the image is projected onto the wall surface or where the wall surface itself is a display). The display device may also be a display device that realizes so-called augmented reality. Specifically, when the sample 60 is captured by an imaging device of a smartphone, tablet, or glass-type wearable device, a corresponding group of descriptions may be displayed around the sample 60 in the captured image. The input device may be a device that detects a user's operation by use of image recognition technology.

Seventh Modification

In the embodiment, where the sample 60 is placed at the analysis target position A to be analyzed, a description related to the sample 60 is displayed. However, for example, a description related to the sample 60 may be displayed if the user opens the lid of a small bottle containing aromatic oil corresponding to the sample 60. Similarly, for example, a natural object may be placed on a plate and covered with a transparent cover, and if the user removes the transparent cover, a description related to the smell of the natural object may be displayed.

Eighth Modification

Not only one sample 60 may be placed at the analysis target position, and plural samples may be placed there at the same time. In this case, a description for each of the samples will be displayed in a display area corresponding to the position of each of the samples 60.

Ninth Modification

The visual appearance of the displayed description may be two-dimensional or three-dimensional. The displayed "description" is not limited to text, and may also be a color, an abstract form, or an image such as of that of a person/scene.

The present invention may be provided as an information processing method that includes processing steps executed by the information processing device 10. The present invention may also be provided as a program that is executed by the information processing device 10. Such a program may be provided on a recording medium such as an optical disk, or may be provided via a network such as the Internet, and then installed and executed on the computer.

Although the present invention has been described in detail above, it will be apparent to those skilled in the art that the present invention is not limited to the embodiments described herein. The invention can be implemented as modified and altered without departing from the purpose and scope of the invention as determined by the description in the claims. Accordingly, the description herein is for illustrative purposes only and is not limitative of the present invention.

DESCRIPTION OF REFERENCE SIGNS

1 . . . Information providing system, 20 . . . Projector, 40 . . . Sensor, 60 . . . Sample, 61 . . . Tag, 101 . . . CPU,

11

102 . . . ROM, 103 . . . RAM, 104 . . . auxiliary storage device, 105 . . . communication IF, 11 . . . sample identification unit 12 . . . position identification unit, 13 . . . Description DB storage unit, 14 . . . Display control section.

The invention claimed is:

1. An information processing device comprising:
a sensing surface on which a plurality of objects are located; and
a processor programmed to:
  specify locations of the plurality of objects on the sensing surface that stimulate a user's sense of smell or taste; and
  control a display to display, in a display area corresponding to a location of one object among the plurality of objects on the sensing surface, a plurality of descriptions relating to a sense of smell or taste stimulated by the object, each of the descriptions being displayed by a predetermined appearance,
wherein the sensing surface is configured to read information from a tag of the object that is placed on the sensing surface via a short-range wireless communication standard, the plurality of displayed descriptions being obtained based on the information from the tag,
wherein the sensing surface is configured to receive and detect a touch operation on one of the plurality of descriptions by the user,
wherein when said one of the plurality of displayed descriptions is selected by the user on the sensing surface, the display is controlled to display, on the sensing surface, at least one relational image, which is an image showing a relationship between the selected one description and other objects that correspond to the sense of smell or taste associated with the selected one description, and
wherein the relational image is a line-shaped image displayed on the sensing ace which connects a display position of the one description selected by the user and a location where at least one of the other objects is placed, and the relational image is displayed with an appearance in accordance with a strength of the relationship.

2. The information processing device according to claim 1, wherein
the processor controls the display to display the plurality of descriptions by an appearance that corresponds to a relationship between the object and the plurality of descriptions relating to the sense of smell or taste stimulated by the object.

3. The information processing device according to claim 1, wherein
the processor controls the display to display the plurality of descriptions by an appearance that corresponds to a relationship between the user's preference for smell or taste and the plurality of descriptions relating to the smell or taste stimulated by the object.

4. The information processing device according to claim 1, wherein
the processor controls the display to display the plurality of descriptions in an appearance that corresponds to an attribute of the sense of smell or taste stimulated by the object.

5. The information processing device according to claim 1, wherein
the processor controls the display to display the plurality of descriptions in an appearance that corresponds to an attribute of the plurality of descriptions relating to the sense of smell or taste stimulated by the object.

6. The information processing device according to claim 1, wherein
the processor controls the display to display the relational image by an appearance that accords with the sense of smell or taste associated with the selected one description and a preference of the user for the sense of smell or taste.

7. A non-transitory computer readable storage medium that stores a program for causing a computer to implement steps comprising:
specifying locations of a plurality of objects on a sensing surface that stimulate a user's sense of smell or taste, and
displaying, in a display area on the sensing surface corresponding to a location of one object among the plurality of objects, a plurality of descriptions relating to a sense of smell or taste stimulated by the object, wherein each of the plurality of descriptions is displayed by a predetermined appearance,
controlling the sensing surface to read information from a tag of the object that is placed on the sensing surface via a short-range wireless communication standard, the plurality of the displayed descriptions being obtained based on the information from the tag,
controlling the sensing surface to detect and receive a touch operation on one of the plurality of descriptions by the user,
wherein when said one of the plurality of the displayed descriptions is selected by the user on the sensing surface, displaying, on the sensing surface, at least one relational image, which is an image showing a relationship between the selected one description and other objects that correspond to the sense of smell or taste associated with the selected one description, and
wherein the relational image is a line-shaped image displayed on the sensing surface which connects a display position of the one description selected by the user and a location where at least one of the other objects is placed, and the relational image is displayed with an appearance in accordance with a strength of the relationship.

8. An information providing system comprising:
an input device;
a display device;
a sensing surface on which a plurality of objects are located which is configured to receive and detect a touch operation; and
an information processing device including a processor programmed to:
  specify locations of the plurality of objects on the sensing surface that stimulate a user's sense of smell or taste; and
  control the display device to display, in a display area corresponding to a location of one object among the plurality of objects on the sensing surface, a plurality of descriptions relating to a sense of smell or taste stimulated by the object, each of the descriptions being displayed by a predetermined appearance,
wherein the sensing surface is configured to read information from a tag of the object that is placed on the sensing surface via a short-range wireless communication standard, the plurality of the displayed descriptions being obtained based on the information from the tag,
wherein the sensing surface receives and detects the touch operation on one of the descriptions, by the user, and wherein when said one of the plurality of displayed descriptions is selected by the user on the sensing surface, the display displays, on the sensing surface, at least one relational image, which is an image showing a relationship between the selected one description and other objects that correspond to the sense of smell or taste associated with the selected one description, and wherein the relational image is a line-shaped image displayed on the sensing surface which connects a display position of the one description selected by the user and a location where at least one of the other objects is placed and the relational image is displayed with an appearance in accordance with a strength of the relationship.

* * * * *